United States Patent Office 3,421,868
Patented Jan. 14, 1969

3,421,868
FREE FALL SHALE HYDROGASIFICATION
Herman F. Feldmann, Berkeley, Ill., assignor to Institute of Gas Technology, a corporation of Illinois
No Drawing. Filed Mar. 19, 1964, Ser. No. 353,278
U.S. Cl. 48—197  4 Claims
Int. Cl. C10j *1/20;* C10l *3/00*

ABSTRACT OF THE DISCLOSURE

A process for recovering natural gas supplements, such as methane and ethane, from oil shale wherein the mineral carbonate decomposition is greatly reduced. A free falling oil shale is passed through a reaction zone of at least about 1100° F. and at a hydrogen pressure of at least about 400 p.s.i.g. Hydrogen is simultaneously passed through the reaction zone so that oil vapor is driven from the oil shale and the oil vapor is converted into methane and ethane by the hydrogen.

---

This invention relates to a process for the recovery of natural gas supplements, such as methane and ethane, from oil shale, and it particularly relates to a process for the recovery of natural gas from oil shale, wherein the undesirable decomposition of mineral carbonates, commonly found in oil shale, is substantially reduced.

Oil shale is known to contain relatively large quantitiese of hydrocarbons, and various processes are known for processing oil shale in order to recover natural gas supplements therefrom. However, a major problem encountered in the production of such natural gas supplements from oil shale by hydrogasification procedures has been the undesired decomposition of mineral carbonates, mainly dolomite ($MgCO_3.CaCO_3$) and calcite ($CaCO_3$). These mineral carbonates are present predominantly in oil shales which have been found to be most suitable for the production of pipeline gas supplements. The decomposition of the mineral carbonates is considered to be highly undesirable not only because large amounts of heat are wasted in the decomposition reactions, but also because the carbon dioxide formed by the decompositions consumes large quantities of expensive hydrogen gas used in the hydrogasification procedures, as a result of the reverse water gas shift reaction ($CO_2+H_2 \rightarrow CO+H_2O$). Furthermore, the presence of carbon oxides, such as carbon monoxide and carbon dioxide, in the product gas make it difficult to produce a high B.t.u. gas from oil shale and it also increases the cost of the product gas because of required gas purification.

Therefore, it is an important object of this invention to provide a novel process for the recovery of natural gas supplements from oil shale, wherein the disadvantages of prior art hydrogasification procedures are substantially eliminated.

It is a further object of this invention to provide a process for the recovery of natural gas supplements, as methane and ethane, from oil shale, wherein the decomposition of mineral carbonates, and the disadvantages thereof, are reduced or substantially avoided.

It is also an object of this invention to provide a process for the recovery of natural gas supplements from oil shale wherein a relatively high B.t.u. gas is directly produced from the oil shale starting material.

It is another object of this invention to provide a procless for recovering natural gas supplements, including methane and ethane, from various oil shales wherein the product gas is highly economical since gas purification procedures are greatly simplified due to the substantially reduced proportion of carbon oxides present therein.

It is still another object of this invention to provide a process for the recovery of natural gas supplements from oil shale, wherein oil vapors are driven from the oil shale in a shortened period of time and yet are retained in the reaction zone for a period of time sufficiently long to cause hydrogenation of the oil vapors, while the oil shale, after the oil vapors have been driven therefrom, pass through the reactor in a greatly reduced period of time, to thereby substantially avoid the decomposition of mineral carbonates contained therein.

It is still a further object of this invention to provide a process for recovering natural gas supplements from oil shale, wherein carbonate decomposition is substantially reduced without decreasing the yield of desired gaseous hydrocarbons.

Further purposes and objects of this invention will appear as the specification proceeds.

I have now discovered that in hydrogasification of oil shale, oil vapor intermediates are driven off very rapidly from the oil shale (more specifically from the kerogen in the oil shale) and the oil vapor intermediates then become intimately associated with the hydrogen gas present in the reactor, to thus cause hydrogenation of the oil vapor intermediate, while significant decomposition of the oil vapor intermediate, while significant decomposition of the mineral carbonates in the oil shale occurs over a substantially longer period of time. Thus, the thermal decomposition and subsequent hydrogenation of the kerogen in the oil shale occurs in the following manner (1) Kerogen→oil vapor intermediates.
(2) Oil vapor intermediates+hydrogen→ethane
+methane+aromatic liquids.

Surprisingly, the kerogen decomposition, which provides the oil vapor intermediates, is very rapid and ordinarily takes place in no greater than about 1–18 seconds. Furthermore, it has been found that the hydrogenation of the oil vapor intermediates for providing the desired end products, such as ethane and methane, ordinarily occurs in about 20–80 seconds. The diffusion of reactants at the oil shale particle surface is believed to be an important factor in the rate of gaseous hydrocarbon production; this diffusion may be assisted by increasing the relative velocity between the oil shale particle and the gas stream.

Previously, all known hydrogasification procedures for the production of natural gas supplements from oil shale have utilized a moving bed process, wherein oil shale particles are passed through a reactor or reaction zone, at the required pressure and temperature conditions and in the presence of hydrogen. In a moving bed operation, substantial mineral decomposition occurs since the shale moves at a relatively low rate, thereby forming substantial quantities of the undesired carbon oxides.

I have now discovered a method wherein oil shale particles pass through the hydrogasification reaction zone in an extremely short period of time, thereby substantially reducing carbonate decomposition, while the oil vapor phase has a sufficient residence time in the reaction zone to become hydrogenated. Generally, my hydrogasification process for recovering natural gas supplements from oil shale, comprises the step of passing freely falling oil shale through a reaction zone at the appropriate temperature and pressure conditions for driving off the oil vapors from the oil shale and for hydrogenating the oil vapor intermediates so driven off.

The oil shale used in my process may be of almost any known type; specifically, Colorado oil shale has been found to provide very good results when used as a starting material in my process. Desirably, the oil shale utilized has an organic carbon to organic hydrogen ratio of about 6-8:1. Advantageously, the oil yield for the oil shale is about that of Colorado oil shale, that is, about 36 gallons per ton of shale.

In order to accomplish the desired results, the gaseous hydrogen pressure in the hydrogasification reactor or reaction zone is maintained at at least about 400 p.s.i.g., and preferably at obut 1000–1500 p.s.i.g., while the temperature of the reaction zone is maintained at at least about 1050° F. and preferably at about 1100–1200° F. These conditions are maintained both for the purpose of decomposing the kerogen to provide the oil vapor intermediates and for effecting hydrogenation of the oil vapors.

In carrying out my proress, there is a considerable number of variables which are involved. One of the more important variable factors is the rate of heat transfer to the oil shale particles, whereby the oil vapors are driven from the particles in a sufficiently short period of time to substantially avoid mineral carbonate decomposition; in this regard, the diameter of or particle size of the oil shale particles freely falling through the reactor is quite significant. For a large particle, the time required to raise the temperature thereof to a level sufficient for driving the oil vapors therefrom would require that the residence time of the particle in the reaction zone be for a relatively long period of time, as compared to the residence time required for a small particle. In determining the size of oil shale particle to be used, it is important that a particle is to pass through the reactor before there is any substantial decomposition of the mineral carbonates contained therein. Although the oil shale particle size may be varied over rather wide limits, particularly satisfactory results have been accomplished by utilizing an oil shale particle size of about −55 to +200 U.S. Sieve.

Further variable factors which are involved in my process are the physical dimensions of the hydrogasification reactor or reaction zone, and the flow rate of the hydrogen and the direction of flow in the reactor. As earlier mentioned, the relative volicity between an oil shale particle and the hydrogen passing through the reactor is of considerable importance since the oil vapor phase is to be present in the reaction zone for a period of at least about 20–30 seconds, in order to effect a hydrogenation of the oil vapor. The inside dimensions, as the inside diameter of a reactor tube, together with the flow rate of the hydrogen through the reactor, are determinative of the relative velocity therebetween; also, the direction of the flow of the hydrogen, which may be either co-current with or counter-current to the free falling shale, has a significant effect on the relative velocity. It has been found that a reactor tube having a diameter of about 2 inches is particularly satisfactory when the flow rate of the hydrogen passing through the reactor is co-current to the free falling shale and is at a rate of about 1.50–5.0 s.c.f. per hour per pound of oil shale passing through the reactor. Also, the hydrogen pressure maintained in the reactor is significant since higher reactor pressures involve the presence of increased quantities of hydrogen in a reactor of a given size.

As to the height of the reactor, this may be varied over a rather wide range, but it must be of such a height that the freely falling oil shale passing through is to be resident in the reactor for a period, sufficiently short in time, to substantially avoid decomposition of the mineral carbonates, but be resident for a sufficiently long period to cause oil vapors to be driven therefrom. A reactor height of 6 feet has been found to be sufficient to provide the desired results.

The rate of oil shale particle flow is not considered to be of great importance, it being required that the particles actually fall freely through the reactor; it has been found that a flow rate of about 34 pounds of oil shale particles per hour provides the desired results of my improved process.

Generally, the time of each oil shale particle in the reactor is about 1–18 seconds. In this period of time, there is a greatly reduced amount of mineral carbonate decomposition and the resulting carbon monoxide and carbon dioxide impurities. Furthermore, the period of time is adequate for driving the oil vapors from the oil shale and for causing the oil vapor intermediates to become intimately associated with the hydrogen in the reactor so as to effect hydrogenation of the oil phase. Since the flow of hydrogen through the reactor is at a much lower rate than the flow of particles therethrough, the residence time of the oil vapor phase in the reactor is considerably longer than that of the oil shale particles, to thereby cause the required hydrogenation of the oil vapors. Generally, the residence time of the oil vapor phase in the reactor has been found to be about 80 seconds, which is sufficient to effect substantial hydrogenation of oil vapors in the reactor.

The shale particles pass through the reactor and are collected at the bottom thereof as residue; the gas formed in the reactor is further processed for purification purposes, water and organic liquids being removed from the product gas by utilizing conventional procedures. The product gas generally contains small portions of carbon monoxide and carbon dioxide, while there are substantial portions of methane and ethane, together with smaller proportions of other gases, such as hydrogen.

From the foregoing, it is seen that all of the earlier mentioned objects have been accomplished. My improved hydrogasification procedure provides a highly economical and simplified method for recovering natural gas supplements from oil shale. The freely falling shale through the hydrogasification reactor substantially avoids the decomposition of mineral carbonates, which uses up hydrogen and wastes heat. While substantially reducing mineral carbonate decomposition, my process provides substantially the same gaseous hydrocarbon yield as previous procedures. Further, since carbon oxide impurities are only minimal in the product gas of my process, purification costs are substantially reduced, as a relatively high B.t.u. gas is produced directly from the shale.

The following examples are provided in order to more fully illustrate my invention, but it is to be understood that the various conditions, temperatures, pressures, reactor dimensions, etc. are not to be considered as a limitation of the scope of the invention, but rather it is intended that all equivalents obvious to those having skill in the art are to be included within the scope of the invention, as claimed.

EXAMPLE I

As a basis for a comparison between the present invention anr prior procedures, a test, utilizing a moving bed in a hydrogasification reactor, was run.

Colorado oil shale having an oil field of 36 gallons per ton of shale was utilized. The ultimate analysis of one pound of the shale was 17.12% organic carbon, 2.31% hydrogen, 5.03% mineral carbon (present as carbonates) 17.12% oxygen, nitrogen, and sulfur, and the remainder being ash. The shale was passed through a moving bed reactor, and hydrogen was passed, co-current to the shale, through the reactor at a rate of 4.74 s.c.f. per hour per cubic foot of reactor space. The reactor was maintained at a temperature of about 1250° F. and at a pressure of about 1200 p.s.i.g.

For every pound of oil shale passing through the reactor, about 0.7557 pound of residue was collected at the bottom thereof. The residue had an analysis of 6.19% organic carbon, 0.36% hydrogen, and 4.01% mineral carbon, the remainder being ash, oxygen, nitrogen, and sulfur. 0.0176 pound of water and 0.0118 pound of organic liquids were separated from the product gas, by using conventional procedures.

0.2401 pound of product gas was recovered per pound of shale and the product gas included 66.4% of the organic carbon which was fed into the system. The heating value of the product gas was 757 B.t.u./s.c.f. The product gas analysis was 34.2 mole percent methane, 13.0 mole percent ethane, 1.3 mole percent propane and butane, 0.2 mole percent benzene, 34.5 mole percent hydrogen, 8.4 mole percent carbon monoxide, 6.8 mole percent carbon dioxide, 1.5 mole percent nitrogen, and 0.1 mole percent hydrogen sulfide. The gaseous hydrocarbon space time yield was 909 s.c.f. per cubic foot per hour. The mineral carbonate decomposition was 38.4%.

EXAMPLE II

Oil shale, having an oil yield of 36 gallons per ton of shale, had an analysis of 17.32% organic carbon, 2.37% organic hydrogen, 16.55% oxygen, nitrogen and sulfur, and 5.06% mineral carbon. The oil shale, having a particle size ranging from —55 to +200 U.S. Sieve, was passed through a free fall reactor at a rate of about 34 pounds per hour. The reactor used was 2 inches in diameter and 6 feet high.

Hydrogen was passed through the reactor, co-current to the flow of shale therethrough, at a rate of 4.50 s.c.f. per hour per cubic foot of reactor space. The reactor was maintained at a pressure of 1200 p.s.i.g. by the hydrogen, while the opposite ends of the reactor were at a temperature of 1000° F. and the center portion of the reactor was at a temperautre of 1320° F. The shale particles free fall residence time in the reactor is calculated to be in the range of about 4.24 to 16.38 seconds.

0.8178 pound of oil shale per pound of oil shale feed was recovered as residue at the bottom thereof. The residue had an analysis of 5.43% organic carbon, 0.32% organic hydrogen, and 5.71% mineral carbon, the remainder being ash, oxygen, nitrogen and sulfur. 0.0065 pound of water and 0.01800 pound of organic liquids, mostly aromatic were separated from the product gas. The product gas had a heating value of 805 B.t.u./s.c.f., 0.1817 pound of product gas being recovered per pound of oil shale feed. The product gas contained 65.2% by weight of the organic carbon in the feed shale. The composition of the product gas was 33.0% methane, 15.7% ethane, 1.3% propane, 0.1% propylene, 0.1% benzene, 44.4% hydrogen, 0.1% hydrogen sulfide, 0.8% nitrogen, 2.8% carbon monoxide and 1.7% carbon dioxide. The gaseous hydrocarbon space time yield was 898 s.c.f. per cubic foot per hour and the mineral carbonate decomposition was 7.7%.

EXAMPLE III

Colorado oil shale, having a particle size of —10 to +55 U.E. Sieve and having an analysis of 17.79% organic carbon, 2.40% hydrogen, and 4.85% mineral carbon, was utilized. Freely falling shale was passed through a 2 inch diameter, 6 foot long reactor having a pressure of 1025 p.s.i.g. The temperature of the reactor at its ends was 1000° F. and at its center was 1365° F. Hydrogen was passed through the reactor co-current to the freely falling shale, at a rate of 1.74 s.c.f. per pound of oil shale. The shale particles free fall residence time in the reactor is calculated to be in the range of about 0.732–4.24 seconds.

The residue recovered from the reactor was 0.8336 pound per pound of shale feed and had an analysis of 7.65% organic carbon, 0.48% organic hydrogen, and 5.36% mineral carbon. 0.0088 pound of water and 0.0173 pound of organic liquids were separated from the product gas by using conventionaly procedures.

The product gas had a heating value of 949 B.t.u./s.c.f. and about 0.1264 pounds of gas being recovered per pound of oil shale feed. The product gas contained 43.7% by weight of the organic carbon present in the feed shale. The product gas composition, by mole percent, was methane 68.8%, ethane 9.8%, propane 0.6%, ethylene 0.3%, propylene 0.1%, butene 0.1%, benzene 0.2%, hydrogen 10.8%, hydrogen sulfide 0.1%, nitrogen 1.5%, carbon monoxide 3.1%, and carbon dioxide 4.6%. The gaseous hydrocarbon space time yield was 549 s.c.f. per cubic foot per hour and the mineral carbonate decomposition was 8.2%.

EXAMPLE IV

Colorado oil shale, having a particle size of —55 to +200 U.S. Sieve and having an analysis of 17.13% organic carbon, 2.38% organic hydrogen, and 5.00% mineral carbon, was utilized. Freely falling oil shale was passed through the reactor at a rate of about 34 pounds per hour and the hydrogen feed was passed through the reactor, co-current to the flow of shale, at a rate of 1.72 s.c.f. per pound of oil shale passing therethrough. The reactor diameter was 2 inches and its length was 6 feet.

The reactor temperature was maintained above 1000° F. and the pressure was maintained at 1010 p.s.i.g. The shale particles free fall residence time in the reactor is calculated to be in the range of about 4.44 to 18.4 seconds.

The residue recovered at the bottom of the reactor was 0.8365 pound per pound of oil shale feed and had an analysis of 6.85% organic carbon, 0.48% organic hydrogen, and 5.7% mineral carbon. The product gas issuing from the reactor was treated by conventional procedures for removing 0.0114 pound of water and 0.0313 pound of organic liquids.

0.1315 pound of product gas was recovered per pound of oil shale feed. The heating value of the product gas was 994 B.t.u./s.c.f. and the gas contained 41.5% by weight of the organic carbon in the feed shale. The product gas composition, by mole percent, was 62.1% methane, 14.8% ethane, 1.1% propane, 0.4% ethylene, 0.2% propylene, 0.1% butene, 0.1% acetylene, 0.1% benzene, 12.1% hydrogen, 0.2% hydrogen sulfide, 0.4% nitrogen, 3.5% carbon monoxide, and 4.8% carbon dioxide. The gaseous hydrocarbon space time yield was 472 s.c.f./per cubic foot per hour and the mineral caronate decomposition was 5.3%.

What we claim and desire to secure by Letters Patent is:

1. A process for recovering natural gas supplements, such as methane and ethane, from oil shale wherein the decomposition of the mineral carbonates within the oil shale is substantially reduced, said process comprising the steps of passing freely falling oil shale having a particle size of about —10 to +200 U.S. Sieve through a reaction zone having a temperature of at least about 1100° F. and having a pressure from hydrogen of at least about 400 p.s.i.g., and simultaneously passing said hydrogen through said reaction zone, whereby oil vapor is driven from said shale and said oil vapor is hydrogenated by said hydrogen, while said oil shale particles, after said oil particles are driven therefrom, pass through said reaction zone in about 1 to 18 seconds with substantially reduced decomposition of the mineral carbonates therein, said oil vapor being resident in said reaction zone for a period of about 20–80 seconds.

2. The process of claim 1 wherein the temperature of said reaction zone is at about 1100–1400° F.

3. The process of claim 1 wherein the pressure of said reaction zone is at about 1000–1500 p.s.i.g.

4. A process for recovering natural gas supplements, such as methane and ethane from oil shale wherein the decomposition of the mineral carbonates in the oil shale is substantially reduced, said process comprising the steps of passing freely falling oil shale particles having a particle size of about —10 to +200 U.S. Sieve through a reaction zone having a temperature of about 1100–1400° F. and having a pressure from hydrogen of about 1000–1500 p.s.i.g., and simultaneously passing said hydrogen through said reaction zone at a rate of about 1.5–5 s.c.f. per pound of coil shale passing through said reaction zone, whereby the oil vapor in said oil shale is driven therefrom and said oil vapor is hydrogenated by said hydrogen, while said oil shale particles pass through said reaction zone in about 1–18 seconds, whereby there is substntially reduced decomposition of the mineral carbonates therein, said oil vapor being present in said reaction zone for a period of about 20–80 seconds.

References Cited

UNITED STATES PATENTS

| | | | |
|---|---|---|---|
| 2,732,332 | 1/1956 | Geller | 201—34 X |
| 3,106,521 | 10/1963 | Huntington | 48—197 X |
| 3,118,746 | 1/1964 | Stratford | 48—197 |
| 3,244,615 | 4/1966 | Huntington | 48—197 X |

FOREIGN PATENTS 114,971  4/1918  Great Britain.

JOSEPH SCOVRONEK, *Primary Examiner.*

U.S. Cl. X.R.

208—11